US009223790B1

(12) United States Patent
Brandwine

(10) Patent No.: US 9,223,790 B1
(45) Date of Patent: Dec. 29, 2015

(54) MANAGING DELETION OF DATA IN A DATA STORAGE SYSTEM

(75) Inventor: Eric J. Brandwine, Haymarket, VA (US)

(73) Assignee: Amazon Technologies, Inc., Seattle, WA (US)

(*) Notice: Subject to any disclaimer, the term of this patent is extended or adjusted under 35 U.S.C. 154(b) by 209 days.

(21) Appl. No.: 13/222,660

(22) Filed: Aug. 31, 2011

(51) Int. Cl.
G06F 17/30 (2006.01)

(52) U.S. Cl.
CPC .............. G06F 17/30088 (2013.01)

(58) Field of Classification Search
CPC .......... G06F 17/30067; G06F 2201/84; G06F 11/1435; G06F 17/30088; G06F 11/2094; G06F 17/3015
USPC ........... 707/639, 649, 692, 657, 659; 711/161
See application file for complete search history.

(56) References Cited

U.S. PATENT DOCUMENTS

| 6,640,278 | B1* | 10/2003 | Nolan et al. ................. 711/6 |
| 6,654,830 | B1* | 11/2003 | Taylor et al. ................. 710/74 |
| 7,568,075 | B2* | 7/2009 | Fujibayashi et al. ........ 711/154 |
| 7,664,771 | B2* | 2/2010 | Kusters et al. ............... 707/639 |
| 8,284,198 | B1* | 10/2012 | Hackworth et al. ........ 345/440 |
| 8,307,174 | B1* | 11/2012 | Misra et al. ................. 711/161 |
| 8,588,590 | B1* | 11/2013 | Kotab ......................... 386/295 |
| 9,009,437 | B1* | 4/2015 | Bjornsson et al. .......... 711/170 |
| 2003/0158863 | A1* | 8/2003 | Haskin et al. ............... 707/200 |
| 2004/0059878 | A1* | 3/2004 | Madany ....................... 711/154 |
| 2005/0177745 | A1* | 8/2005 | Oswald et al. .............. 713/201 |
| 2006/0053139 | A1* | 3/2006 | Marzinski et al. .......... 707/101 |
| 2006/0206536 | A1* | 9/2006 | Sawdon et al. ............. 707/200 |
| 2007/0300017 | A1* | 12/2007 | Snijder et al. .............. 711/148 |
| 2008/0022133 | A1* | 1/2008 | Sobel et al. ................. 713/193 |
| 2010/0131727 | A1* | 5/2010 | Eguchi et al. .............. 711/162 |
| 2011/0022801 | A1* | 1/2011 | Flynn .......................... 711/120 |
| 2011/0197024 | A1* | 8/2011 | Thomas ....................... 711/114 |
| 2012/0110038 | A1* | 5/2012 | Volvovski et al. .......... 707/822 |
| 2012/0151250 | A1* | 6/2012 | Saika ........................... 714/4.11 |
| 2014/0214764 | A1* | 7/2014 | Robbin et al. .............. 707/634 |

* cited by examiner

Primary Examiner — Robert Beausoliel, Jr.
Assistant Examiner — Alexandria Bromell
(74) Attorney, Agent, or Firm — Davis Wright Tremaine LLP

(57) ABSTRACT

In certain embodiments, a system comprises a memory and a processor communicatively coupled to the memory. The memory includes executable instructions that upon execution cause the system to generate, at a first time, a first snapshot capturing data stored in storage units of a storage device. The executable instructions upon execution cause the system to receive an indication to delete at least a portion of the data in the storage units and captured by the first snapshot, and to mark, in response to receiving the indication, the one or more storage units that store the at least a first portion of the data as available. The executable instructions upon execution cause the system to generate, at a second time subsequent to the first time, a second snapshot that omits the one or more storage units marked as available.

20 Claims, 4 Drawing Sheets

MANAGING DELETION OF DATA IN A DATA STORAGE SYSTEM

BACKGROUND

Traditional file systems, and other layers that may interface with a hard disk, delete data by abandoning the data in the space that contains the data. When the data is marked for deletion, traditional file systems internally note that the space is available for more data. While at the file system level the data has been "deleted," the data still resides in the space (e.g., on a storage unit) that contains the data. At the storage unit level, the hard disk is uninformed as to the deletion of the data and still recognizes the "deleted" data as residing in the space that stores the data.

BRIEF DESCRIPTION OF THE DRAWINGS

For a more complete understanding of the present disclosure and its advantages, reference is made to the following descriptions, taken in conjunction with the accompany drawings in which.

DETAILED DESCRIPTION OF EXAMPLE EMBODIMENTS

Data storage systems often provide users with a variety of data storage solutions to meet the needs and demands of each user. For example, one user may request 500 gigabytes of data storage while another user may request over 1 terabyte of data storage and for each user, those needs may change over time. Thus it may be desirable for data storage systems to efficiently manage each user's data. A data storage system may provide data storage backup capabilities to a user. Because in traditional systems, data deleted at the file system level is not treated as deleted at the storage unit level, data storage backup solutions may copy data no longer useful to the user as part of the data storage backup. This causes unnecessarily large data storage backups. As another example, for efficiency purposes, a data storage system may provide a data cache to temporarily store data from a particular user. The data cache may transparently offer less data storage than is allotted to the user by the data storage system. As the data cache fills up with data, it may be appropriate to transfer the data to data storage devices. However, in traditional systems, data deleted at the file system level may still count as stored data in the data cache when determining whether a particular data cache is full. Therefore, when preserving a current state of the hard disk in a snapshot, the snapshot contains data that was "deleted" at the file system level. Consequently, the snapshot is not an accurate reflection of the current state of the hard disk or other data storage device.

Certain embodiments of the present disclosure exclude data deleted at the file system level when creating memory snapshots of data storage devices. This may result in a reduction of the amount of data to be copied into a particular memory snapshot. It may also reduce the amount of storage for storing a plurality of memory snapshots. Therefore, a user that grew their data on their data storage device and then shrunk it would get the benefit of smaller, faster, and cheaper memory snapshots. As another example, certain embodiments can more accurately and efficiently provide data cache solutions to users. Because data deleted at the file system level, but still residing in the data cache level, will be omitted from being counted towards a threshold amount of data before the data cache is emptied, there may be fewer instances of transferring data from the data cache to a data storage device resulting in a more efficiently operating data storage system.

Certain embodiments of the present disclosure provide techniques for managing the deletion of data in a data storage system.

Figure 1:
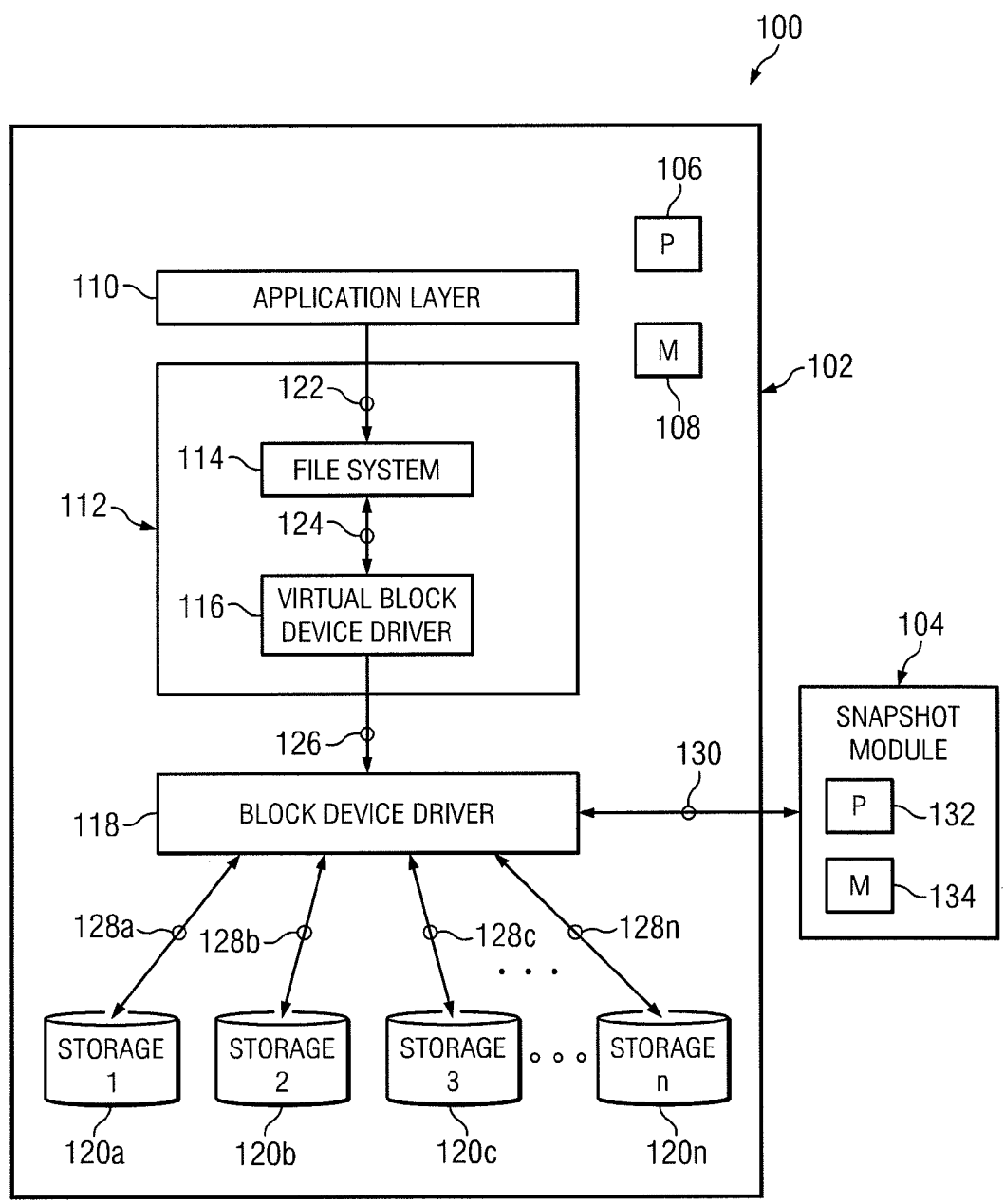
FIG. 1 illustrates an example system for managing deleted data in a physical memory system, according to certain embodiments of the present disclosure.

FIG. 1 illustrates an example system for managing the deletion of data in a data storage system. In the illustrated example, data storage system 100 includes processing system 102 and snapshot module 104. Although data storage system 100 is illustrated and primarily described as including particular components, the present disclosure contemplates data storage system 100 including any suitable components, according to particular needs.

In general, processing system 102 may be any computing device, such as one or more computers, with a physical storage system. In the illustrated example, processing system 102 comprises processor 106, memory 108, application layer 110, operating system 112, block device driver 118, and one or more storage devices 120. Processor 106 may include one or more microprocessors, controllers, or any other suitable computing devices or resources. Processor 106 may work, either alone or with components of data storage system 100, to provide a portion or all of the functionality of data storage system 100 described herein. Processor 106 communicatively couples to memory 108. Memory 108 may take the form of volatile or non-volatile memory including, without limitation, magnetic media, optical media, random-access memory (RAM), read-only memory (ROM), removable media, or any other suitable memory component.

Memory 108 may be internal or external to processor 106 and, in certain embodiments, may include one or more instruction caches or one or more data caches. Instructions in the instruction caches may be copies of instructions in memory 108, and the instruction caches may speed up retrieval of those instructions by processor 106. Data in the data caches may include any suitable combination of copies of data in memory 108 for instructions executing at processor 106 to operate on, the results of previous instructions executed at processor 106 for access by subsequent instructions executing at processor 106, or for writing to memory 108, and other suitable data. The data caches may speed up read and/or write operations by processor 106.

Processing system 102 may include or otherwise have access to one or more storage devices 120. Storage devices 120 are used by data storage system 100 to store blocks of data. These blocks of data may have any suitable size, according to particular needs. Each storage device 120 may include a plurality of storage units where blocks of data may be stored. In certain embodiments, storage device 120 may be a block device that supports reading and writing data in fixed-size and/or variable-size blocks, sectors, clusters, or other appropriate storage units. As just a few examples, storage device 120 may be a non-volatile memory such as a hard disk drive with a plurality of blocks, flash memory with a plurality of blocks, magnetoresistive RAM with a plurality of magnetic tunnel junctions, magnetic tape with a plurality of blocks, or optical disk with a plurality of blocks. The present disclosure contemplates storage devices 120 being any suitable combination of any suitable types of storage devices.

Processing system 102 may include application layer 110. Generally, application layer 110 may provide application services to a user interacting with processing system 102. Application layer 110 may include any suitable combination of software, hardware, and firmware that provides a user access to the functionality of processing system 102. Application layer 110 may provide services that allow an end-user to complete a particular task utilizing processing system 102. For example, application layer 110 may include enterprise software, document management software, graphical editors, web browsers, media editors, or any other software application that may allow an end-user to complete a particular task utilizing processing system 102. In certain embodiments, application layer 110 may receive user input to store or delete data and facilitates the storing or deletion of the data. Although only the actions of storing and deleting data are discussed, data storage system 100 may be fully capable of meeting any other data processing needs of a user, piece of software, or piece of hardware such as accessing, modifying, copying, transferring data, or any other data processing action. Application layer 110 may communicate one or more messages 122 to operating system 112. Message 122 may comprise a request to store, modify, or delete particular data.

Processing system 102 may include operating system 112. Operating system 112 manages the resources of processing system 102. For example, operating system 112 may provide application layer 110 access to the various hardware components of processing system 102. Examples of operating systems are MICROSOFT WINDOWS, MAC OS X, and LINUX. In the illustrated embodiment, operating system 112 includes file system 114 and virtual block device driver 116. Operating system 112 may use file system 114 to store or delete data. Generally, file system 114 is an abstraction layer that allows a user to store and organize data using processing system 102. File system 114 may allow a user to access data by file name or directory while the data is physically stored at the storage unit level. In particular, file system 114 may manage and organize collections of data in a human-readable format. For example, file system 114 may organize a discrete collection of data as files with a human-readable filename while the actual data is stored in storage devices 120.

Application layer 110 may be used to manipulate the files organized by file system 114. In response to receiving message 122, file system 114 may communicate message 124 to virtual block device driver 116. Message 124 may comprise a request to store or delete particular data at the storage unit level (e.g., in one or more storage units of one or more storage devices 120). In response to message 124, virtual block device driver 116 may confirm to file system 114 that particular data has been stored or deleted. File system 114 may then represent that particular data as being stored or deleted to operating system 112, application layer 110, the user, and/or any other entity that has access to file system 114.

Virtual block device driver 116 may be a virtualized front end for storage devices 120. Virtual block device driver 116 may allow file system 114 to interact with data stored in storage devices 120 without giving file system 114 direct access to storage devices 120. Although data storage system 100 is depicted as including file system 114, the present disclosure contemplates system 100 not including file system 114. Additionally or alternatively, system 100 may include one or more other types of systems (either in combination with file system 114 or in the absence of file system 114) that may issue one or more messages 124.

In response to message 124, virtual block device driver 116 may facilitate the actual storing or deleting of data in storage devices 120 by communicating message 126 to block device driver 118. Message 126 may comprise a request to store or delete particular data in storage devices 120. Generally, block device driver 118 is responsible for organizing particular blocks of data at the storage unit level. For example, block device driver 118 may maintain the locations where particular data resides on storage devices 120. In certain embodiments, block device driver 118 may contain a reference table with entries for which storage units of storage device 120 contain data (sometimes referred to as being "dirty") and which storage units of storage device 120 are available to store data. In general, if a storage unit of storage device 120 is marked as available to store data and contains data, block device driver 118 is no longer concerned with protecting that data from being overwritten or deleted. The data stored in the storage unit that is marked as available may or may not actually be deleted from the storage unit. In certain embodiments, a storage unit of storage device 120 that is marked as available may be referred to as being "clean" and the data that may be included in the storage unit may be referred to as no longer being allocated in the storage unit.

In response to message 126, block device driver 118 may facilitate the storing or deleting of particular data by communicating message 128 to storage device 120, message 128 comprising a request to store or delete particular data in storage units of storage device 120. For example, block device driver 118 may store data in storage device 120a by communicating message 128a to storage device 120a. In response to message 128a, data is stored in specific storage units of storage 120a. In certain embodiments, block device driver 118 may determine the specific storage units of storage device 120a that will store the data. After storing the data in particular storage units in storage device 120a, block device driver 118 may mark those storage units as unavailable to store data. As another example, in response to message 126 requesting the deletion of specific data, block device driver 118 may determine the specific data is stored in storage device 120b. Block device driver 118 may mark the particular storage units of storage device 120b containing the specific data as available to store data. In certain embodiments, once particular storage units are marked as available, the data residing in those storage units will remain in the storage units until new data is written into those storage units. In certain embodiments, block device driver 118 may communicate message 128b to storage device 120b requesting the data be deleted from the particular storage units of storage device 120b.

Data storage system 100 includes snapshot module 104. Generally, snapshot module 104 is responsible for creating memory snapshots of data stored in storage devices 120. In certain embodiments, snapshots are copies of data (e.g., data stored in one or more storage units of storage devices 120) that can be used for backup purposes, restoration purposes, data mirroring purposes, or any other purpose where it may be useful to retain data. For example, a snapshot may provide a "picture" of the data stored in one or more of storage devices 120 at a point in time. In subsequent points of time, a snapshot may only include data that was added in one or more storage devices 120 that was not captured in a previous snapshot. A snapshot may be taken for a particular selection of one or more storage devices 120, a particular selection of one or more storage units, a particular selection of one or more user, or any suitable selection of data for particular needs.

Snapshot module 104 comprises processor 132 and memory 134. Processor 132 may include one or more microprocessors, controllers, or any other suitable computing devices or resources. Processor 132 may work, either alone or with components of data storage system 100, to provide a portion or all of the functionality of data storage system 100 described herein. Processor 132 communicatively couples to memory 134. Memory 134 may take the form of volatile or non-volatile memory including, without limitation, magnetic media, optical media, RAM, ROM, removable media, or any other suitable memory component. In certain embodiments, a portion or all of memory 134 may store one or more database data structures, such as one or more structured query language (SQL) servers or relational databases. Although depicted separately and individually in FIG. 1 for illustrative purposes, the functionality and capabilities of processors 106 and 132 may be included in a single processor or multiple processors. Similarly, although memories 108 and 134 are depicted separately and individually in FIG. 1 for illustrative purposes, the functionality and capabilities of memories 108 and 134 may be included in a single memory or multiple memories. For example, processing system 102 and snapshot module 104 may be consolidated or separate, according to particular needs.

In certain embodiments, snapshot module 104 may initiate a snapshot by communicating message 130 to block device driver 118 requesting to copy the data contained in storage devices 120. In response to message 130, snapshot module 104 may be granted access to block device driver 118. Snapshot module 104 may determine which storage units of storage devices 120 contain data from block device driver 118. For example, in response to message 130, block device driver 118 may return information regarding storage units containing data in storage devices 120. In certain embodiments, the information returned may be the storage units marked (e.g., in the reference table) as unavailable to store data and/or as "dirty." In certain embodiments, block device driver 118 may return the data from the storage units in storage devices 120 that are marked as unavailable to store data and/or as "dirty." According to some embodiments, after snapshot module 104 has created a snapshot of "dirty" storage units, snapshot module 104 may mark those storage units as "clean." Snapshot module 104 may keep track of "clean" and "dirty" storage units in a reference table managed by block device driver 118, a reference table managed by snapshot module 104, or in any other data structure capable of tracking information regarding storage units. Storage units marked as available to store data in storage devices 120 and/or as "clean" may be omitted from being captured in a snapshot by snapshot module 104. In certain embodiments, the term "dirty" may or may not refer to a storage unit that is unavailable to store data. A storage unit that is considered "dirty" signifies a storage unit containing data that snapshot module 104 may include in a snapshot. In certain embodiments, the term "clean" may or may not refer to a storage unit that is available to store data. A storage unit that is considered "clean" signifies a storage unit that snapshot module 104 may not include in a snapshot because the storage unit does not contain data, the storage unit contains data included in a previous snapshot, or the storage unit contains data that is no longer allocated and has been effectively "deleted."

Snapshot module 104 may store the snapshot in memory 134, memory 108, or any other suitable component capable of storing data. Snapshot module 104 may take snapshots periodically on a pre-scheduled basis, after the occurrence of an event such as new data stored or deleted, or at any other time initiated by a user, processing system 102, or any other suitable component of data storage system 100. In certain embodiments, snapshot module 104 may be able to use snapshots to restore particular data contained in storage devices 120 by copying the data from the snapshots into storage devices 120. In certain embodiments, snapshot module 104 may be able to restore particular data contained in storage devices 120 by copying the data from the snapshots into storage devices other than storage devices 120.

Certain embodiments of the present disclosure may provide some, none, or all of the following technical advantages. For example, certain embodiments exclude data deleted at file system 114 when creating snapshots of data storage devices 120. This allows for an efficient solution to creating snapshots as it reduces the amount of data to be copied into a particular snapshot. It also reduces the amount of storage for storing a plurality of snapshots. Therefore, a user that grew their data on their data storage device 120 and then shrunk it would get the benefit of smaller, faster, and cheaper snapshots.

Figure 2:
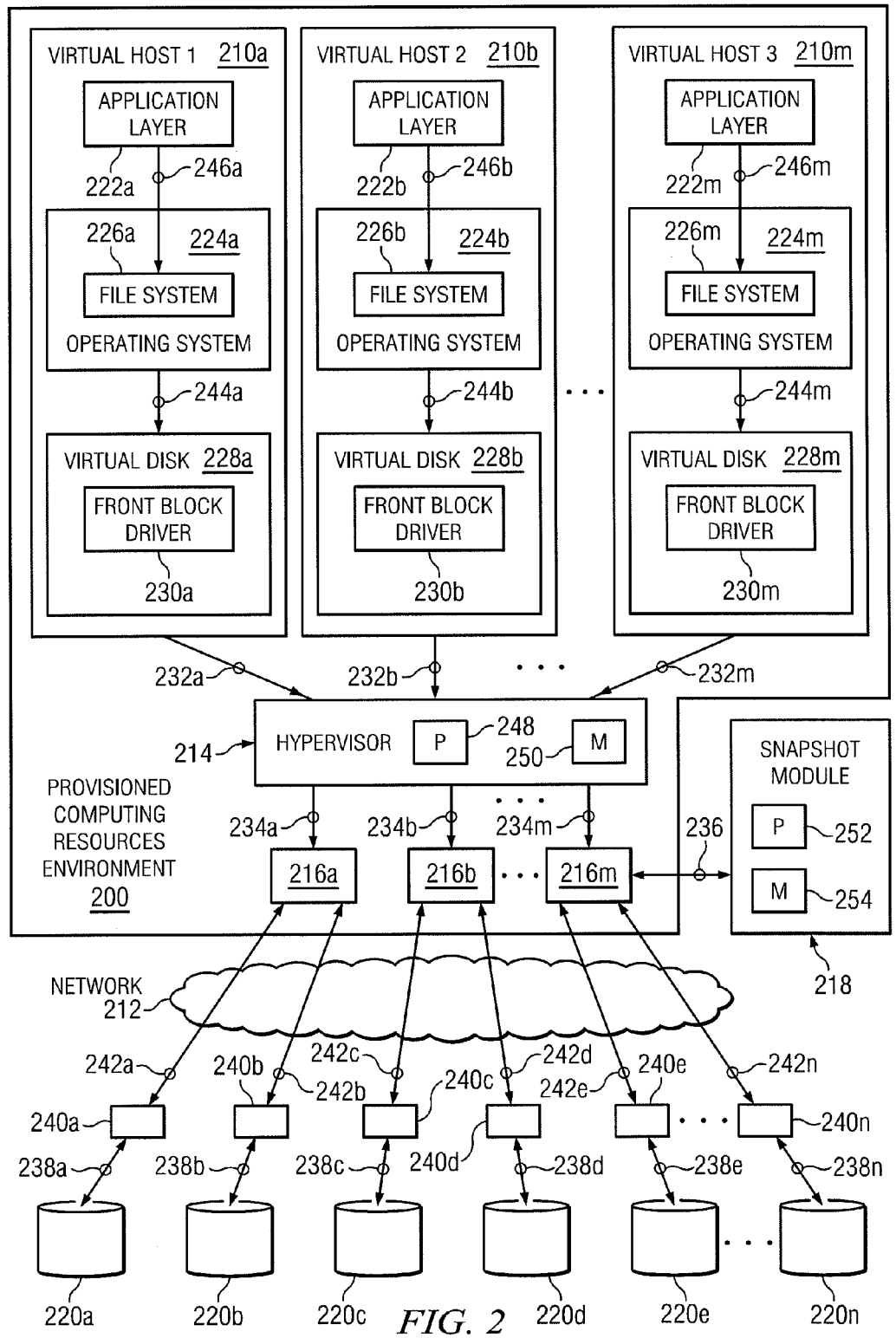
FIG. 2 illustrates an example system for managing deleted data in an abstract memory system, according to certain embodiments of the present disclosure.

FIG. 2 illustrates an example system for managing deleted data in provisioned computing resources environment 200. In the illustrated example, provisioned computing resources environment 200 includes hosts 210, network 212, hypervisor 214, back block driver 216, storage devices 220, caches 240, and snapshot module 218. Although provisioned computing resources environment 200 is illustrated and primarily described as including particular components, the present disclosure contemplates provisioned computing resources environment 200 including any suitable components, according to particular needs.

In general, provisioned computing resources environment 200 (including, for example, one or more of hosts 210, hypervisor 214, back block driver 216, storage devices 220, caches 240, and snapshot module 218) provides a collection of hosting services over a network (which may or may not be network 212). Those hosting services may include any suitable combination of, for example, storage, computer processing, networking, applications, power, or any other suitable computing resource that may be made available over a network.

Network 212 facilitates wireless or wireline communication. In certain embodiments, network 212 may be optional. Network 212 may communicate, for example, IP packets, Frame Relay frames, Asynchronous Transfer Mode (ATM) cells, voice, video, data, and other suitable information between network addresses. Network 212 may include one or more personal area networks (PANs), local area networks (LANs), a wireless LAN (WLAN), a virtual private network (VPN), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, an extranet, a satellite network, and/or any other communication system or systems at one or more locations, any of which may be any suitable combination of wireless and wireline.

Hosts 210 may include any suitable computing resources that may be made available over a network. Hosts 210 include any suitable combination of hardware, firmware, and software. As just a few examples, hosts 212 may include any suitable combination of applications, power, processor, storage, and any other suitable computing resources that may be made available over a network. In certain embodiments hosts 212 may be servers, laptop computers, desktop computers, cellular devices, tablet devices, portable devices, or any other device with a processor capable of running software. For example, hosts 210 may be instances of virtualization software running on a host server in provisioned computing resources environment 200. Provisioned computing resources environment 200 is flexible enough to accommodate any combination of hosts 210.

Each host 210 may have an associated application layer 222, operating system 224, and virtual disk 228 that provide various operations. These components are described below.

Host 210 may contain application layer 222. Generally, application layer 222 provides application services to an end-user interacting with host 210. More specifically, application layer 222 may be any software, hardware, or combination thereof that provides an end-user access to the functionality of host 210. Application layer 222 provides services that allow an end-user to complete a particular task utilizing host 210. For example, application layer 210 may include enterprise software, document management software, graphical editors, web browsers, media editors, or any other software application that may allow an end-user to complete a particular task utilizing computer 210. In certain embodiments, application layer 222 may receive user input to store or delete data and facilitates the storing or deletion of the data. Although only the actions of storing and deleting data are discussed, provisioned computing resources environment 200 is fully capable of meeting any other data processing needs of a user, piece of software, or piece of hardware such as accessing, modifying, copying, transferring data, or any other data processing action.

Application layer 222 communicates message 246 to operating system 224, message 246 comprising a request to store, modify, or delete particular data. For example, application layer 222a of host 210a may communicate message 246a to operating system 224a to store particular data. As another example, application layer 222b of host 210b may communicate message 246b to operating system 224b to delete particular data.

Host 210 may contain operating system 224. Operating system 224 manages the resources of host 210. In particular, operating system 224 provides application layer 222 access to the various resources of host 210. Examples of operating systems 224 are MICROSOFT WINDOWS, MAC OS X, and LINUX. For example, host 210a may run MICROSOFT WINDOWS 7 as operating system 224a, host 210b may run MAC OS X 10.7 as operating system 224b, and host 210c may run RED HAT ENTERPRISE LINUX 6.1 as operating system 224c. In the illustrated embodiment, operating system 224 includes file system 226. Operating system 224 may use file system 226 to store or delete particular data. Generally, file system 226 is an abstraction layer that allows an end user to store and organize data in host 210. In particular, file system 226 manages and organizes collections of data in a human-readable format. For example, file system 226 may organize a discrete collection of data as files with a human-readable filename while the actual data is stored in storage devices 220. A user can use application layer 210 to manipulate the files organized by file system 226.

In response to receiving message 246, file system 226 may communicate message 244 to virtual disk 228, message 244 comprising a request to store or delete particular data at the storage unit level. For example, file system 226a may communicate message 244a to virtual disk 228a to store particular data. In another example, file system 226b may communicate message 244b to virtual disk 228b to delete particular data. In response, virtual disk can confirm to file system 226 that particular data has been stored or deleted. File system 226 may then represent that particular data as being stored or deleted to operating system 224, application layer 222, to the user, or any other component or entity that has access to file system 226. Although host 210 is depicted as including file system 226, the present disclosure contemplates virtual disk 228 receiving an indication such as message 244 from any suitable source and system 200 may or may not include file system 226.

Virtual disk 228 is a virtualized front end for storage devices 220. Virtual disk 228 allows file system 226 to interact with data stored in storage devices 220 without giving file system 226 direct access to storage devices 120. For example, in certain embodiments, virtual disk 228 may be a XEN VIRTUAL DISK. Virtual disk 228 may contain front block driver 230. Front block driver 230 allows virtual disk 228 to have access to storage devices 220 over network 212. In response to message 244, virtual disk 228 may facilitate communication between front block driver 230 and hypervisor 214. Front block driver 230 may communicate message 232 to hypervisor 214. Message 232 may comprise a request to store or delete particular data in storage devices 220. For example, in response to message 244a, front block driver 230a may communicate message 232a to hypervisor 214 to store particular data. In another example, in response to message 244b, front block driver 230b may communicate message 232b to hypervisor 214 to delete particular data. Generally, hypervisor 214 is a layer of software running on computer hardware that virtualizes host 210. Hypervisor 214 may be any software, hardware, or combination thereof that allows for the virtualization of hosts 210 on particular hardware.

In the illustrated embodiment, hypervisor 214 comprises processor 248 and memory 250. Processor 248 may include one or more microprocessors, controllers, or any other suitable computing devices or resources. Processor 248 may work, either alone or with components of provisioned computing resources environment 200, to provide a portion or all of the functionality of provisioned computing resources environment 200 described herein. Processor 248 communicatively couples to memory 250. Memory 250 may take the form of volatile or non-volatile memory including, without limitation, magnetic media, optical media, RAM, ROM, removable media, or any other suitable memory component. In certain embodiments, a portion or all of memory 250 may store one or more database data structures, such as one or more structured query language (SQL) servers or relational databases.

In certain embodiments, hypervisor 214 may be software running on any hardware component of provisioned computing resources environment 200 capable of running software. For example, hypervisor 214 may be a XEN HYPERVISOR running on a host server. In response to message 232, hypervisor 214 may communicate message 234 to back block driver 216 requesting back block driver 216 to store or delete particular data. For example, in response to message 232a, hypervisor 214 may communicate message 234a to back block driver requesting it to store particular data. In another example, in response to message 232b, hypervisor 214 may communicate message 234b to back block driver to delete particular data.

Generally, back block driver 216 is responsible for organizing particular blocks of data at the storage unit level and/or at the cache unit level. Back block driver 216 may maintain the locations where particular data resides inside storage devices 220. For example, back block driver 216 may contain a reference table with entries for which storage units of storage device 220 contain data and which storage units of storage device 220 are available to store data.

The example system 200 of FIG. 2 may include or otherwise have access to one or more storage devices 220. Storage devices 220 are used by back block driver 216 to store blocks of data. These blocks of data may have any suitable size, according to particular needs. Each storage device 220 may include a plurality of storage units where blocks of data may be stored. In certain embodiments, storage device 220 may be a block device that supports reading and writing data in fixed-size and/or variable-size blocks, sectors, clusters, or other appropriate storage units. As just a few examples, storage device 220 may be a non-volatile memory such as a hard disk drive with a plurality of blocks, flash memory with a plurality of blocks, magnetoresistive RAM with a plurality of magnetic tunnel junctions, magnetic tape with a plurality of blocks, or optical disk with a plurality of blocks. The present disclosure contemplates storage devices 220 being any suitable combination of any suitable types of storage devices.

In certain embodiments, the example system of FIG. 2 may include caches 240. For example, a host 210 or other entity may be allocated a certain amount of storage space capable of storing blocks of data for the host 210 or other entity. However, it may be desirable for certain reasons, such as efficiency and resource conservation, to only provide a subset of the total storage space available to host 210. In such instances, cache 240 may be employed to store data temporarily. For example, host 210a might be allocated 1 terabyte (TB) of storage space in storage device 220a. Within a particular host 210a, that host's application layer 222a, operating system 224a, file system 226a, virtual disk 228a, or any other component of host 210a may recognize host 210a having access to 1 TB of storage space. However, provisioned computing resources environment 200 may only provide 200 gigabytes (GB) of storage space, via cache 240a, at a time to host 210a. When cache 240a is near or at capacity, provisioned computing resources environment 200 may empty the data from cache 240a into storage unit 220a.

In certain embodiments, cache 240 may be any allocation of memory or storage of fixed and/or variable size capable of temporarily storing data. For example, cache 240 may be a part of memories 250, 254, storage devices 220, or any other component of provisioned hosting environment 200 capable of storing data. In response to message 234, block device driver 216 may facilitate the storing or deleting of particular data by communicating message 242 to cache 240. In certain embodiments, message 242 may be communicated over network 212. Message 242 may comprise a request to store or delete particular data in cache units in cache 240. In response to message 242, data may be stored or deleted in particular cache units in cache 240 and back block driver 216 may mark the particular cache units as available or unavailable to store data. For example, back block driver 216a may store data in cache 240a by communicating message 242a to cache 240a. In response to message 242a, data is stored in specific cache units in cache 240a. In certain embodiments, the specific storage units to store the data may be determined by back block driver 216a. After storing the units in cache 240a, back block driver 216a may mark those cache units as unavailable to store data and/or as "dirty."

As another example, in response to message 234b requesting the deletion of specific data, back block driver 216a may determine that the specific data is stored in cache 240b. Back block driver 216a may mark the particular cache units containing the specific data as available to store data and/or as "clean." In certain embodiments, once particular cache units are marked as available, the data residing in those cache units will remain in the cache units until new data is written into those cache units. In certain embodiments, back block driver 216a may communicate message 242b to cache 240b, message 242b comprising a request to delete data from particular cache units. In another example, in response to message 234b requesting the deletion of specific data, back block driver 216a may determine that the specific data is stored in storage device 220b.

Back block driver 216 may mark the particular storage units containing the specific data as available to store data. In certain embodiments, once particular storage units are marked as available, the data residing in those storage units will remain in the storage units until new data is written into those storage units. In certain embodiments, back block driver 216a may communicate a message to storage device 220b to delete the data from particular storage units. Although in the illustrated embodiment certain ratios may be shown for many components such as host 210, cache 240, back block driver 216, and storage device 220, provisioned computing resources environment 200 is capable of associating none, one, or more caches 240, back block drivers 216, and/or storage devices 220 with a particular host 210 as required by particular needs.

Back block driver 216 may determine that data is to be moved from cache 240 to storage device 220. In such instances, back block driver 216 may facilitate the communication of message 238 between cache 240 and storage device 220, message 238 comprising a request to store data in storage device 220 that currently resides in cache 240. In response, storage device 220 may store the data. Back block driver 216 may then mark the particular storage units in storage device 220 as unavailable to store data and mark the particular cache units in cache 240 as available to store data. In certain embodiments where there is no cache 240 or where back block driver 216 determines to bypass cache 240, back block driver 216 may directly communicate message 242 to storage device 220 to store data, message 242 comprising a request to store data in storage device 220.

The example system 200 of FIG. 2 includes snapshot module 218. Generally, snapshot module 218 is responsible for creating snapshots of data stored in storage devices 220. Snapshots are copies of data that can be used for backup purposes, restoration purposes, data mirroring purposes, or any other purpose where it may be useful to retain data.

Snapshot module 218 comprises processor 252 and memory 254. Processor 252 may include one or more microprocessors, controllers, or any other suitable computing devices or resources. Processor 252 may work, either alone or with components of provisioned computing resources environment 200, to provide a portion or all of the functionality of provisioned computing resources environment 200 described herein. Processor 252 communicatively couples to memory 254. Memory 254 may take the form of volatile or non-volatile memory including, without limitation, magnetic media, optical media, RAM, ROM, removable media, or any other suitable memory component. In certain embodiments, a portion or all of memory 254 may store one or more database data structures, such as one or more structured query language (SQL) servers or relational databases. Although depicted separately and individually in FIG. 2 for illustrative purposes, the functionality and capabilities of processors 248 and 252 may be included in a single processor or multiple processors. Similarly, although memories 250 and 254 are depicted separately and individually in FIG. 2 for illustrative purposes, the functionality and capabilities of memories 250 and 254 may be included in a single memory or multiple memories.

In certain embodiments, snapshot module 218 may begin to take a snapshot by communicating message 236 to back block driver 216 requesting to copy the data contained in storage devices 220 and/or caches 240. In response to message 236, snapshot module 218 is granted access to back block driver 216. Snapshot module 218 is able to determine which storage units of storage devices 220 and/or which cache units of caches 240 contain data from back block driver 216. For example, in response to message 236, back block driver 216 may return information regarding storage units containing data in storage devices 220. As another example, in response to message 236, back block driver 216 may return information regarding cache units containing data in caches 240. In certain embodiments, part of the data may be stored in storage device 220 and another part in cache 240.

In certain embodiments, the information returned may be the storage units and/or cache units marked (e.g., in the reference table) as unavailable to store data and/or as "dirty." In certain embodiments, block device driver 216 may return the data from the storage units in storage devices 220 that are marked as unavailable to store data and/or as "dirty." Snapshot module 218 may create a snapshot of the storage units in storage devices 220 that are marked as unavailable to store data and/or as "dirty." Storage units marked as available to store data and/or "clean" in storage devices 220 are omitted from being captured in a snapshot by snapshot module 218. Snapshot module 218 may store the snapshot in memory 254, memory 250, or any other suitable component capable of storing data in provisioned computing resources environment 200. Snapshot module 218 may take snapshots periodically on a pre-scheduled basis, after the occurrence of an event such as new data stored or deleted, or at any other time initiated by a user, host 210, or any other suitable component of provisioned computing resources environment 200.

In certain embodiments, snapshot module 218 may be able to use snapshots to restore particular data contained in storage devices 220 by copying the data from the snapshots into storage devices 220. In certain embodiments, snapshot module 218 may be able to restore particular data contained in storage devices 220 by copying the data from the snapshots into storage devices other than storage devices 220.

According to some embodiments, after snapshot module 218 has created a snapshot of "dirty" storage units, snapshot module 218 may mark those storage units as "clean." Snapshot module 218 may keep track of "clean" and "dirty" storage units in a reference table managed by back block driver 216, a reference table managed by snapshot module 218, or any other data structure capable of tracking information regarding storage units. The term "dirty" may or may not refer to a storage unit that is unavailable to store data. A storage unit that is considered "dirty" signifies a storage unit containing data that snapshot module 218 may include in a snapshot. The term "clean" may or may not refer to a storage unit that is available to store data. A storage unit that is considered "clean" signifies a storage unit that snapshot module 218 may not include in a snapshot because the storage unit does not contain data, the storage unit contains data included in a previous snapshot, or the storage unit contains data that is no longer allocated and has been effectively "deleted."

Certain embodiments of the present disclosure may provide some, none, or all of the following technical advantages. For example, certain embodiments exclude data deleted at the file system level when creating snapshots of data storage devices. This may allow for an efficient solution for creating snapshots as it may reduce the amount of data to be copied into particular snapshots, potentially reducing the amount of storage for storing snapshots. Therefore, a user that grew his or her data on an associated data storage device and then shrunk the data would get the benefit of smaller, faster, and cheaper snapshots. As another example, certain embodiments can more accurately and efficiently provide data cache solutions. Because data deleted at the file system level, but still residing in the data cache level, may be omitted from being counted toward a threshold amount of data before the data cache is emptied, fewer instances of transferring data from the data cache to a data storage device may occur, which may result in more efficient operation of provisioned computing resources environment 200.

Figure 3:
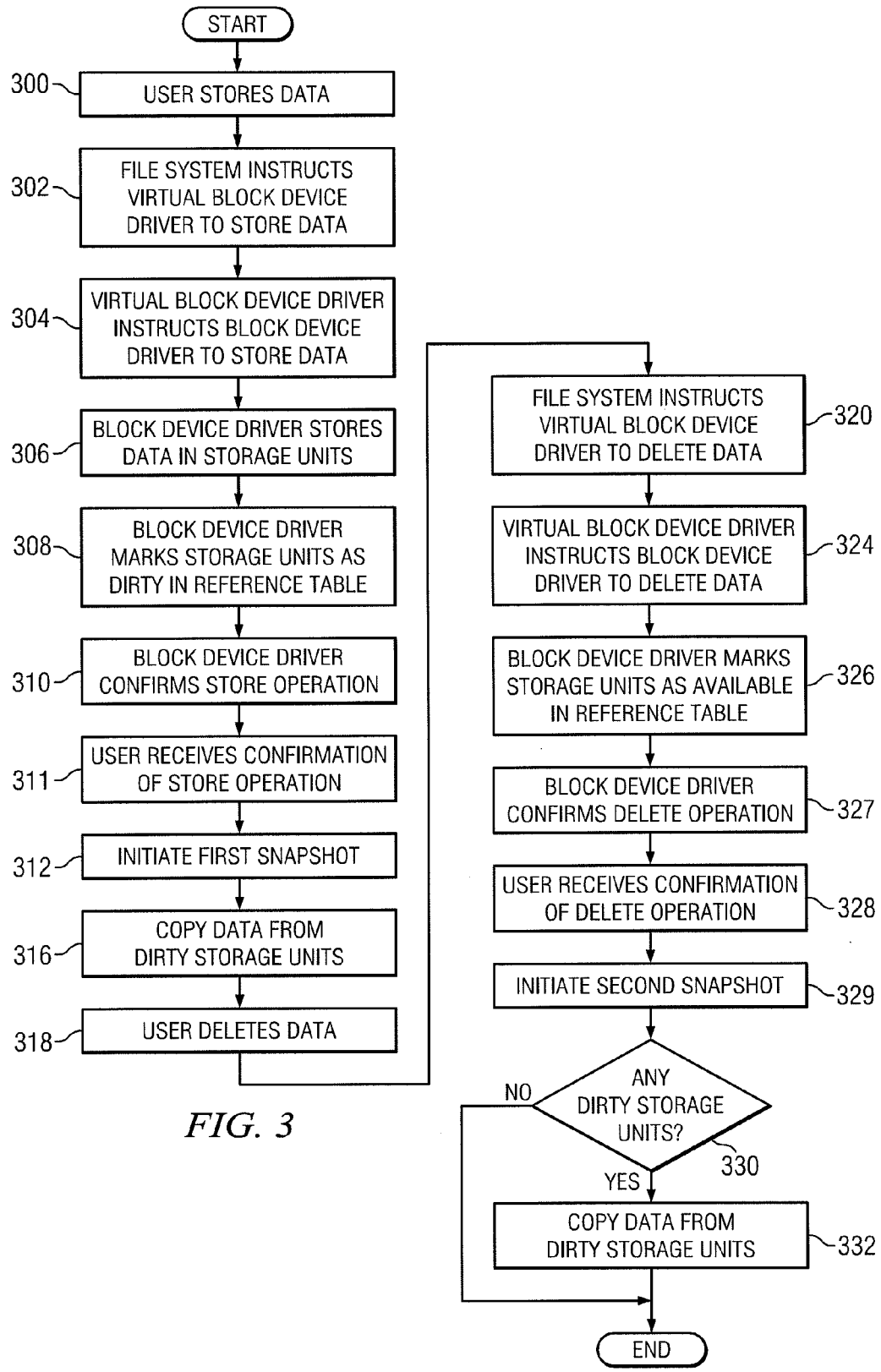
FIG. 3 illustrates an example method for managing deleted data in a data storage system, which may be performed by the example data storage system of FIG. 1 according to certain embodiments of a present disclosure.

FIG. 3 illustrates an example method for managing deleted data in a data storage system, which may be performed by the example data storage system 100 of FIG. 1 according to certain embodiments of a present disclosure. The method may be implemented in any suitable combination of software, firmware, and hardware. Although particular components may be identified as performing particular steps, the present disclosure contemplates any suitable components performing the steps according to particular needs.

At step 300, application layer 110 may receive user input to store data and facilitates the storing of the data. Application layer 110 communicates message 122 to operating system 112, message 122 comprising a request to store particular data. At step 302, operating system 112 may use file system 114 to store particular data. In response to receiving message 122, file system 124 may communicate message 124 to virtual block device driver 116, message 124 comprising a request to store or delete particular data at the storage unit level.

At step 304, in response to message 126, block device driver 118 may facilitate the storing of particular data by communicating message 128 to storage device 120, message 128 comprising a request to store particular data in storage units. At step 306, data is stored in particular storage units of storage device 120. For example, block device driver 118 may store data in storage device 120a by communicating message 128a. In response to message 128a, data is stored in specific storage units of storage 120a. In certain embodiments, the specific storage units to store the data may be determined by block device driver 118. At step 308, after storing the data in particular storage units in storage device 120, block device driver 118 may mark those storage units as unavailable to store data and/or as "dirty" in a reference table.

At step 310, block device driver 118 may confirm to file system 114, or any other suitable component of data storage system 100, that particular data has been stored in response to message 124. At step 311, file system 114, or any other suitable component of data storage system 100, may then represent that particular data as being stored to operating system 112, application layer 110, to the user, or any other component or entity that has access to data storage system 100.

At step 312, snapshot module 104 may begin to take a snapshot by communicating message 130 to block device driver 118 requesting to copy the data contained in storage devices 120. In response to message 130, snapshot module 104 is granted access to block device driver 118. Snapshot module 104 is able to determine if there are any storage units marked as unavailable to store data, or "filled" with data. Snapshot module 104 is able to determine which storage units of storage devices 120 contain data from block device driver 118. For example, in response to message 130, block device driver 118 may return information regarding storage units containing data in storage devices 120. In certain embodiments, the information returned may be the storage units marked, in the reference table, as unavailable to store data. In certain embodiments, block device driver 118 may return the data from the storage units in storage devices 120 that are marked as unavailable to store data. Storage units marked as available to store data in storage devices 120 are omitted from being captured in a snapshot by snapshot module 104.

At step 316, snapshot module 104 may copy the data from particular storage units and may store the snapshot in memory 134, memory 108, or any other suitable component capable of storing data in data storage system 100. Snapshot module 104 may take snapshots periodically on a pre-scheduled basis, after the occurrence of an event such as new data stored or deleted, or at any other time initiated by a user, processing system 102, or any other suitable component of data storage system 100.

At step 318, application layer 110 may receive user input to delete data and facilitates the deletion of the data. Application layer 110 communicates message 122 to operating system 112, message 122 comprising a request to delete particular data. At step 320, operating system 112 may use file system 114 to delete particular data. In response to receiving message 122, file system 124 may communicate message 124 to virtual block device driver 116, message 124 comprising a request to delete particular data at the storage unit level.

At step 324, in response to message 124, virtual block device driver 116 may communicate message 126 to block device driver 118. Message 126 may comprise a request to delete particular data at the storage unit level. In certain embodiments, the request to delete particular data at the storage unit level may be a request to actually delete the data or simply an indication that the data is no longer in use or can otherwise be deallocated from the storage unit. At step 326, in response to message 126, block device driver 118 may facilitate the deletion of particular data by marking the particular storage units storing the data as available to store data and/or as "clean." In certain embodiments, block device driver 118 may communicate message 128 to storage device 120, message 128 comprising a request to delete data in the particular storage units of storage device 120. In certain embodiments, block device driver 118 may mark particular storage units of storage device 120 as available to store data and/or as "clean" in a reference table.

At step 327, block device driver 118 may confirm to file system 114, or any other suitable component of data storage system 100, that particular data has been deleted in response to message 124. In certain embodiments, the data may not actually be deleted from the storage units of the one or more storages devices 120 but may simply be marked as deallocated such that those storage units are available for storing data. At step 328, file system 114, or any other suitable component of data storage system 100, may then represent that particular data as being deleted to operating system 112, application layer 110, to the user, or any other component or entity that has access to data storage system 100.

At step 329, snapshot module 104 may begin to take a second snapshot by communicating message 130 to block device driver 118 requesting to copy the data contained in storage devices 120. In response to message 130, snapshot module 104 is granted access to block device driver 118.

At step 330, snapshot module 104 is able to determine if there are any storage units marked as unavailable to store data, or "filled" with data, and/or considered "dirty." Snapshot module 104 is able to determine which storage units of storage devices 120 contain data from block device driver 118. For example, in response to message 130, block device driver 118 may return information regarding storage units containing data in storage devices 120. In certain embodiments, the information returned may be the storage units marked, in the reference table, as unavailable to store data and/or "dirty." In certain embodiments, block device driver 118 may return the data from the storage units in storage devices 120 that are marked as unavailable to store data and/or as "dirty." Storage units marked as available to store data in storage devices 120 and/or as "clean" are omitted from being captured in a snapshot by snapshot module 104. If snapshot module 104 determines no data is contained in any storage unit, step 332 may be skipped.

At step 332, snapshot module 104 may copy the data from particular storage units marked as "dirty" and may store the snapshot in memory 134, memory 108, or any other suitable component capable of storing data in data storage system 100. In certain embodiments, after snapshot module 104 includes a storage unit marked as "dirty" in a snapshot, the storage unit may be marked as "clean." Snapshot module 104 may take snapshots periodically on a pre-scheduled basis, after the occurrence of an event such as new data stored or deleted, or at any other time initiated by a user, processing system 102, or any other suitable component of data storage system 100.

Figure 4:
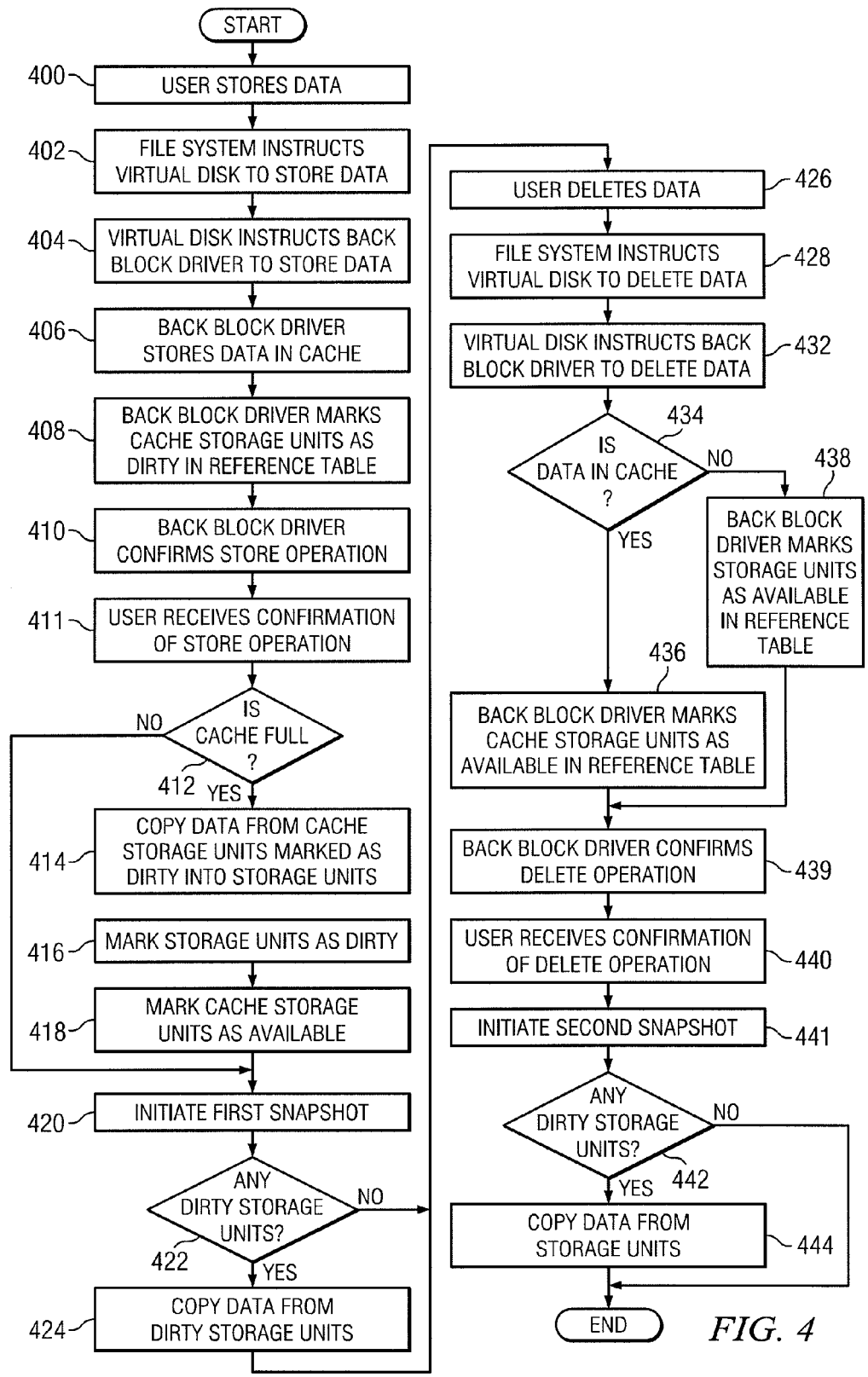
FIG. 4 illustrates an example method for managing deleted data in an abstract memory system, which may be performed by the example provisioned computing resources environment of FIG. 2 according to certain embodiments of a present disclosure.

FIG. 4 illustrates an example method for managing deleted data in an abstract memory system, which may be performed by the example provisioned computing resources environment 200 of FIG. 2 according to certain embodiments of a present disclosure. The method may be implemented in any suitable combination of software, firmware, and hardware. Although particular components may be identified as performing particular steps, the present disclosure contemplates any suitable components performing the steps according to particular needs.

At step 400, application layer 222 may receive user input to store data and facilitates the storing the data. Application layer 222 of host 210 may communicate message 246 to operating system 224 to store particular data. At step 402, operating system 224 may use file system 226 to store particular data. In response to receiving message 246, file system 226 may communicate message 244 to virtual disk 228, message 244 comprising a request to store particular data at the storage unit level.

At step 404, in response to message 244, virtual disk 228 may facilitate communication between front block driver 230 and hypervisor 214. Front block driver 230 may communicate message 232 to hypervisor 214. Message 232 may comprise a request to store particular data in storage devices 220. For example, in response to message 244a, front block driver 230a may communicate message 232a to hypervisor 214 to store particular data. In response to message 232, hypervisor 214 may communicate message 234 to back block driver 216 requesting back block driver 216 to store particular data. For example, in response to message 232a, hypervisor 214 may communicate message 234a to back block driver requesting it to store particular data.

At step 406, in response to message 234, block device driver 216 may facilitate the storing of particular data by communicating message 242 to cache 240, message 242 comprising a request to store or delete particular data in cache units in cache 240. In response to message 242, data may be stored in particular cache units in cache 240. For example, back block driver 216 may store data in cache 240a by communicating message 242a to cache 240a. In response to message 242a, data is stored in specific cache units in cache 240a. In certain embodiments, the specific storage units to store the data may be determined by back block driver 216. At step 408 back block driver 216 may mark the particular cache units as unavailable to store data and/or as "dirty." For example, after storing the units in cache 240a, back block driver 216 may mark those cache units as unavailable to store data and/or as "dirty." In certain embodiments where there is no cache 240 or where back block driver 216 determines to bypass cache

240, back block driver 216 may directly communicate message 242 to storage device 220 to store data, message 242 comprising a request to store data in storage device 220.

At step 410, back block driver 216 may confirm to file system 226, or any other suitable component of host 210, that particular data has been stored. At step 411, file system 226, or any other suitable component of host 210, may then represent that particular data as being stored to operating system 224, application layer 222, to the user, or any other component or entity that has access to file system 226.

At step 412, back block driver 216 may determine whether cache 240 is at, near, or exceeding capacity and thus data is to be transferred from cache 240 to storage device 220. If back block driver 216 determines that data is not to be transferred from cache 240, the example method may proceed to step 420. If back block driver 216 has determined that data is to be transferred from cache 240, the example method may proceed to step 414.

At step 414, back block driver 216 may facilitate the communication of message 238 between cache 240 and storage device 220, message 238 comprising a request to store data in storage device 220 that currently resides in cache units marked as unavailable to store data in cache 240 and/or as "dirty." In response, storage device 220 may store the data. At step 416, back block driver 216 may then mark the particular storage units in storage device 220 as unavailable to store data and/or as "dirty." At step 418, back block driver 418 may mark the particular cache units in cache 240 as available to store data and/or as "clean."

At step 420, snapshot module 218 may begin to take a snapshot by communicating message 236 to back block driver 216 requesting to copy the data contained in storage devices 220 and/or caches 240. In response to message 236, snapshot module 218 is granted access to back block driver 216. At step 422, snapshot module 218 is able to determine which storage units of storage devices 220 and/or which cache units of caches 240 contain data from back block driver 216 and are "dirty." If snapshot module 218 determines that no storage units of storage devices 220 and no cache units of caches 240 contain data and/or are considered "clean," then example method may proceed to step 426.

At step 424, snapshot module 218 may copy the data from particular storage units that are marked "dirty" and may store the snapshot in memory 250, memory 254, or any other suitable component capable of storing data in provisioned computing resources system 200. Snapshot module 218 may take snapshots periodically on a pre-scheduled basis, after the occurrence of an event such as new data stored or deleted, or at any other time initiated by a user, hosts 210, or any other suitable component of provisioned computing resources system 200. In certain embodiments, snapshot module 218 may copy data from cache units of cache 240 where the cache units are marked as unavailable to store data and/or as "dirty." In certain embodiments, after snapshot module 218 includes a storage unit marked as "dirty" in a snapshot, the storage unit may be marked as "clean."

At step 426, application layer 222 may receive user input to delete data and facilitates the deletion of the data. Application layer 222 communicates message 246 to operating system 224, message 246 comprising a request to delete particular data. At step 428, operating system 224 may use file system 226 to delete particular data. In response to receiving message 246, file system 226 may communicate message 244 to virtual disk 228, message 244 comprising a request to delete particular data at the storage unit level. In certain embodiments, the request to delete particular data at the storage unit level may be a request to actually delete the data or simply an indication that the data is no longer in use or can otherwise be deallocated from the storage unit.

At step 432, in response to message 244, virtual disk 228 may facilitate communication between front block driver 230 and hypervisor 214. Front block driver 230 may communicate message 232 to hypervisor 214. Message 232 may comprise a request to delete particular data in storage devices 220. For example, in response to message 244, front block driver 230 may communicate message 232 to hypervisor 214 to delete particular data. In response to message 232, hypervisor 214 may communicate message 234 to back block driver 216 requesting back block driver 216 to delete particular data. For example, in response to message 232, hypervisor 214 may communicate message 234 to back block driver 216 requesting it to delete particular data.

At step 434, in response to message 234, block device driver 216 may facilitate the deleting of particular data by determining whether the particular data to be deleted resides in cache units in caches 240. In certain embodiments, block device driver 216 may determine the location of particular data by accessing a reference table. If the data is not in caches 240, the example method proceeds to step 438. If the data to be deleted resides in caches 240, then example method may proceed to step 436. At step 436, in response to message 234 requesting the deletion of specific data, back block driver 216 may determine that the specific data is stored in cache 240. Back block driver 216 may mark the particular cache units containing the specific data as available to store data and/or as "clean." In certain embodiments, once particular cache units are marked as available, the data residing in those cache units will remain in the cache units until new data is written into those cache units. In certain embodiments, back block driver 216 may communicate message 242 to cache 240, message 242 comprising a request to delete data from particular cache units. At step 439, back block driver 216 may confirm to file system 226, or any other suitable component of host 210, that particular data has been deleted. In certain embodiments, the data may not actually be deleted from the storage units of the one or more storages devices 120 but may simply be marked as deallocated such that those storage units are available for storing data. At step 440, file system 226, or any other suitable component of host 210, may then represent that particular data as being deleted to operating system 224, application layer 222, to the user, or any other component or entity that has access to file system 226. The example method may next proceed to step 441.

At step 438, in response to message 234 requesting the deletion of specific data, back block driver 216 may determine that the specific data is stored in storage device 220. Back block driver 216 may mark the particular storage units containing the specific data as available to store data. In certain embodiments, once particular storage units are marked as available, the data residing in those storage units will remain in the storage units until new data is written into those storage units. In certain embodiments, back block driver 216 may communicate a message to storage device 220 to delete the data from particular storage units.

At step 440, snapshot module 218 may begin to take a second snapshot by communicating message 236 to back block driver 216 requesting to copy the data contained in storage devices 220 and/or caches 240. In response to message 236, snapshot module 218 is granted access to back block driver 216. At step 442, snapshot module 218 is able to determine which storage units of storage devices 220 and/or which cache units of caches 240 contain data from back block driver 216 and are marked as "dirty." If snapshot module 218 determines that no storage units of storage devices 220 and no cache units of caches 240 contain data and/or are marked as "clean," then the example method may skip step 444.

At step 444, snapshot module 218 may copy the data from particular storage units marked as "dirty" and may store the second snapshot in memory 250, memory 254, or any other suitable component capable of storing data in provisioned computing resources system 200. Snapshot module 218 may take snapshots periodically on a pre-scheduled basis, after the occurrence of an event such as new data stored or deleted, or at any other time initiated by a user, hosts 210, or any other suitable component of provisioned computing resources system 200. In certain embodiments, snapshot module 218 may copy data from cache units of cache 240 where the cache units are marked as unavailable to store data and/or as "dirty." After copying data from storage and cache units marked as dirty into a snapshot, snapshot module 218 may mark those units as "clean."

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as falling within the spirit and scope of the appended claims.

What is claimed is:

1. A computer-implemented method, comprising:
   storing, using one or more processors, data in a first plurality of storage units of fixed size of a first storage device;
   receiving, using the one or more processors, an indication to delete at least a portion of the data in the first plurality of storage units of fixed size of the first storage device;
   marking, using the one or more processors and in response to receiving the indication, the one or more storage units of fixed size of the first storage device that store the at least a portion of the data as available;
   transferring, using the one or more processors, data from the first plurality of storage units of fixed size of the first storage device to one or more storage units of a second storage device, excluding the one or more storage units marked as available;
   storing data in a second plurality of storage units of the first storage device;
   determining a total of storage units storing data from the first plurality of storage units and the second plurality of storage units;
   determining whether the total of storage units storing data exceeds a threshold number of storage units storing data; and
   transferring, if the total of storage units storing data exceeds the threshold number of storage units, data from the first plurality of storage units of the first storage device and data from the second plurality of storage units of the first storage device to the one or more storage units of the second storage device, excluding the one or more storage units marked as available.

2. The computer-implemented method of claim 1, wherein marking the one or more storage units of fixed size of the first storage device as available comprises deleting a reference from a reference table, the reference associated with the one or more storage units that store the at least a portion of data.

3. The computer-implemented method of claim 2, wherein the reference table comprises a plurality of references, each reference being associated with one or more storage units containing data.

4. The computer-implemented method of claim 2, wherein the method further comprises generating a snapshot capturing data stored in the one or more storage units of the second storage device; and
   generating the snapshot comprises:
      accessing the reference table;
      determining the one or more storage units marked as available based on the reference table; and
      storing data from the one or more storage units of fixed size marked as unavailable in one or more storage units of a second storage device.

5. The computer-implemented method of claim 1 wherein the second storage device contains more storage units than the first storage device.

6. The computer-implemented method of claim 1, wherein the indication is received from a file system.

7. The computer-implemented method of claim 1, wherein the indication to delete at least the portion of the data comprises an indication that the at least the portion of the data can be deallocated.

8. One or more non-transitory computer-readable media comprising logic, the logic when executed by one or more processors operable to perform operations comprising:
   storing data in a plurality of storage units of a first storage device;
   receiving an indication that at least a portion of the data is no longer allocated in the plurality of storage units of the first storage device;
   marking, in response to receiving the indication, the one or more storage units of the first storage device that store the at least a portion of the data as available;
   transferring data from the plurality of storage units of the first storage device to a first plurality of storage units of a second storage device, excluding the one or more storage units marked as available;
   generating, at a first time, a first snapshot storing data stored in the first plurality of storage units of the second storage device;
   receiving an indication that at least a first portion of the data is no longer allocated in the first plurality of storage units of the second storage device and captured by the first snapshot;
   marking, in response to receiving the indication, the one or more storage units of the second storage device that store the at least a first portion of the data as available;
   storing data in a second plurality of storage units of the second storage device;
   marking, in response to storing data in the second plurality of storage units of the second storage device, the second plurality of storage units of the second storage device as unavailable;
   determining whether one or more storage units are marked as unavailable; and generating, at a second time subsequent to the first time, a second snapshot, the second snapshot:
    omitting the one or more storage units of the second storage device marked as available; and
    storing data stored in the one or more storage units marked as unavailable.

9. The media of claim 8, wherein transferring data from the plurality of storage units of the first storage device comprises:
    determining a total of storage units storing data from the plurality of storage units of the first storage device;
    determining whether the total of storage units storing data exceeds a threshold number of storage units storing data; and
    transferring, if the total of storage units exceeds the threshold number of storage units, data from the plurality of storage units of the first storage device to one or more storage units of the second storage device, excluding the one or more storage units marked as available.

10. The media of claim 8 wherein the second storage device contains more storage units than the first storage device.

11. The media of claim 8, wherein the second snapshot captures data stored in a third plurality of storage units of the second storage device, the third plurality of storage units being at least partially different than the second plurality of storage units.

12. The media of claim 8, wherein marking the one or more storage units of the second storage device as available comprises deleting a reference from a reference table, the reference associated with the one or more storage units that store the at least a first portion of data indicated to be deleted.

13. The media of claim 12, wherein generating each snapshot comprises:
    accessing the reference table;
    determining the one or more storage units of the second storage device marked as available based on the reference table; and
    storing data from the one or more storage units marked as unavailable in one or more storage units of a second storage device, the stored data omitting data that was captured in a previous snapshot.

14. The media of claim 8, wherein the indication is received from a file system.

15. The media of claim 8, wherein the indication to delete at least the first portion of the data comprises an indication that the at least the first portion of the data can be deallocated.

16. A computer-implemented method, comprising:
    storing, using one or more processors, data in a first plurality of storage units of fixed size of a first storage device;
    receiving, using the one or more processors, an indication to delete at least a portion of the data in the first plurality of storage units of fixed size of the first storage device;
    marking, using the one or more processors and in response to receiving the indication, the one or more storage units of fixed size of the first storage device that store the at least a portion of the data as available; and
    transferring, using the one or more processors, data from the first plurality of storage units of fixed size of the first storage device to one or more storage units of a second storage device, by at least:
        determining a total of storage units storing data from the first plurality of storage units of fixed size of the first storage device;
        determining whether the total of storage units storing data exceeds a threshold number of storage units storing data; and
        transferring, if the total of storage units exceeds the threshold number of storage units, data from the first plurality of storage units of the first storage device to one or more storage units of fixed size of the second storage device, excluding the one or more storage units marked as available.

17. The computer-implemented method of claim 16 wherein the indication is generated by an operating system running on a virtual host.

18. The computer-implemented method of claim 17, wherein the virtual host is implemented using a host server machine and the storage device is distinct from the host server machine.

19. The computer-implemented method of claim 16, wherein marking the one or more storage units of fixed size of the first storage device as available comprises deleting a reference from a reference table, the reference associated with the one or more storage units that store the at least a portion of data.

20. The computer-implemented method of claim 19, wherein the method further comprises generating a snapshot capturing data stored in the one or more storage units of the second storage device by at least:
    accessing the reference table;
    determining the one or more storage units marked as available based on the reference table; and
    storing data from the one or more storage units of fixed size marked as unavailable in one or more storage units of a second storage device.

* * * * *